United States Patent [19]

Bernhardt et al.

[11] 4,423,766
[45] Jan. 3, 1984

[54] VACUUM CONDENSATION APPARATUS

[75] Inventors: Karl-Heinz Bernhardt; Helmut Strzala, both of Braunfels, Fed. Rep. of Germany

[73] Assignee: Arthur Pfeiffer Vakuumtechnik Wetzlar GmbH, Asslar, Fed. Rep. of Germany

[21] Appl. No.: 320,511

[22] Filed: Nov. 12, 1981

[30] Foreign Application Priority Data

Nov. 18, 1980 [DE] Fed. Rep. of Germany ....... 3043456

[51] Int. Cl.³ .................... F28F 13/00; F28B 11/00
[52] U.S. Cl. ................................ 165/13; 165/40; 165/114; 203/1; 202/202
[58] Field of Search ............ 165/114, 40, 13; 202/202, 196; 203/1, 86; 137/174, 202

[56] References Cited

U.S. PATENT DOCUMENTS

| | | | |
|---|---|---|---|
| 1,778,921 | 10/1930 | Swartz et al. | 165/40 |
| 1,897,398 | 2/1933 | Raymond | 137/174 |
| 2,848,197 | 8/1958 | Evans, Jr. et al. | 165/114 |
| 4,159,227 | 6/1979 | Sundquist | 203/1 |
| 4,181,577 | 1/1980 | Foley | 202/202 |
| 4,232,598 | 11/1980 | Harlow et al. | 202/202 |

Primary Examiner—Albert W. Davis, Jr.
Assistant Examiner—S. Gayle Dotson
Attorney, Agent, or Firm—Toren, McGeady and Stanger

[57] ABSTRACT

Apparatus for condensing vapors at reduced pressure including a cooled vapor condenser having a liquid level sensor therein with a vacuum pump being connected by way of a control valve for drawing vapor from the vapor chamber of the condenser. The liquid level sensor opens and closes the control valve to control drawing of vapor from the vapor chamber in accordance with the level of liquid in the condenser.

3 Claims, 1 Drawing Figure

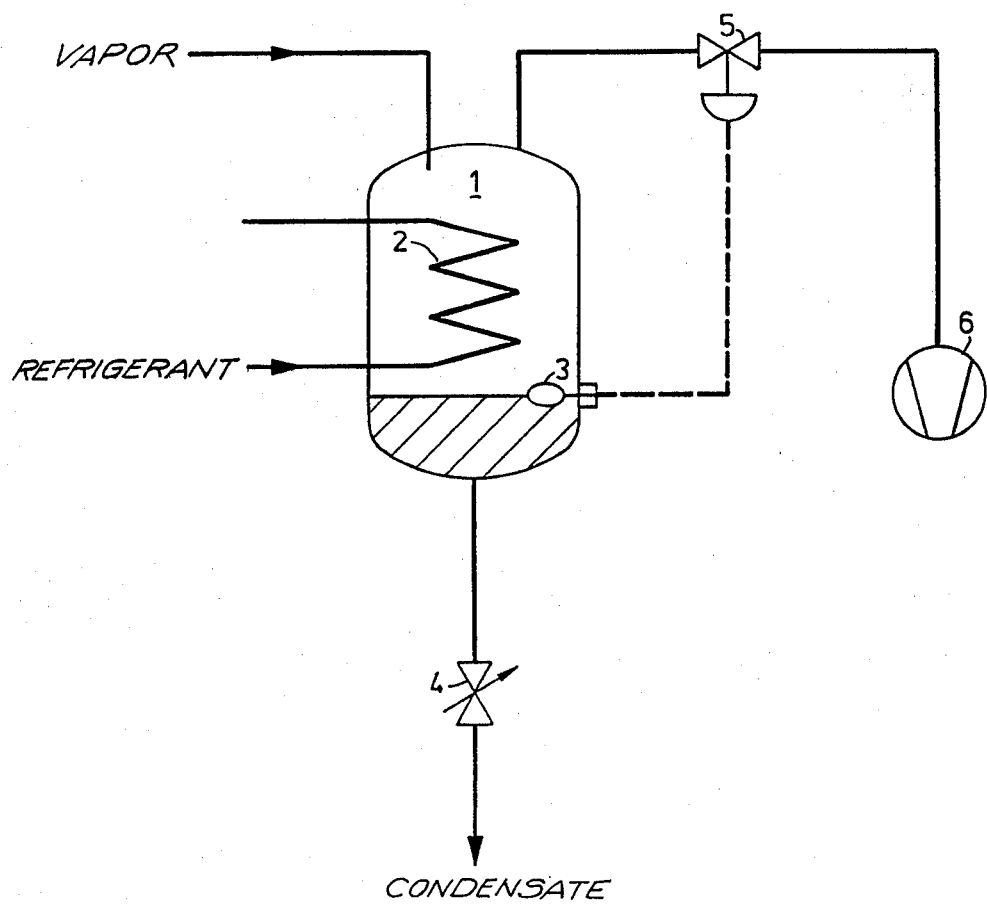

VACUUM CONDENSATION APPARATUS

The present invention relates generally to condensation apparatus for condensing vapors at reduced pressure of the type which may be used, for example, for distillation systems or condensation heating systems. In distillation and condensating heating systems, there will always arise certain quantities of extraneous gases and/or vapors. These are either dissolved in the liquid of the system or they arrive in the system from the exterior thereof, for example by way of leakage or through leakage areas. Such gases or vapors are then conveyed by the vapor which is to be condensed in the system to the condenser of the system. Also, they may penetrate through leakage areas directly into the condenser.

These extraneous gases and vapors will interfere with the condensation process of the system. Accordingly, they must be removed from the condenser. However, until the present, this has been accomplished by continuous pumping. The disadvantage of such a method arises due to the fact that the pressure of the vapor which must be pumped out must be correspondingly low due to the limited vapor tolerance of the pumps. If the vapor tolerance of the pump of the system is insufficient, then measures must be provided to maintain the proportion of the vapors in the pump relatively low.

Such an accomplishment may be effected by providing considerable cooling of the condenser. However, this tends to involve high costs in terms of the apparatus required and the monetary outlays necessary.

Additionally, the supply of vapor to the pump may be throttled by restrictors. However, the disadvantage of this approach is the fact that the restrictors must be matched to the respective quantity of extraneous gases or vapors which are present and this may vary for optimum operation. Additionally, when starting up such a system, fairly high pumping speed is required which must be provided by by-pass lines and valves. Again, this will entail substantially increased expenses.

A further possibility involves controlling the suction capacity of the pump in dependence upon the pressure, i.e., the condensation pressure. However, when utilizing this approach, the setting of the optimum pressure is very critical. If the pressure setting is too high, the condensation power will not be fully utilized. On the other hand, if the pressure setting is too low, a large part of the distillate will be subjected to suction and will therefore be lost.

It is also possible to control the supply of vapor. However, this approach involves larger cost since expensive valves are required for this purpose. Moreover, continuous pumping will lead to a continuous loss of distillate. Operation with a fixed pumping speed of the vacuum pump has proved to be particularly disadvantageous from the point of view of the condenser of a condensation heating system.

Condensation heating systems are used to dry and remove gas from electrical components. Thus, the elements which must be dried in a chamber of such a system at reduced pressure are heated by condensation of the vapor of a heat-carrying liquid wherein the vapor pressure of this medium is always smaller than that of the water at the same temperature. With this heating process, therefore, water vapor is continuously released from the insulation of the items which are to be heated. This tends to interfere with the condensation.

In order to prevent this, a constant quantity of heat-carrying medium is condensed in a condenser. The subsequent vacuum pump will draw out extraneous gases and vapors which are conveyed in the condenser along with the vapor from the heat carrier. Since the pressure in the boiler of the system continuously rises during the heating process, it is necessary to control the suction capacity. However, this can only be achieved in an unsatisfactory manner by the known methods stated above.

Since extraneous gases and vapors and part of the distillate are pumped continuously out of the system and thus are discharged on the discharge side of the vacuum pump, there will be involved considerable pollution of the environment and this may only be reduced at high costs in terms of the apparatus required.

The present invention seeks to provide a device for vacuum condensation which will avoid, or at least reduce, the aforementioned disadvantages and which, in particular, will enable vacuum distillation at lower costs in terms of the apparatus required without involving unnecessary loss of distillate and without involving the unnecessary discharge of quantities of condensate thereby effecting operation which is more favorable in terms of the surrounding environment.

SUMMARY OF THE INVENTION

Briefly, the present invention may be described as vacuum condensation apparatus for condensing vapors at reduced pressure comprising a cooled vapor condenser having a vapor supply line, a liquid level sensor in the vapor condenser, a vacuum pump connected with the vapor chamber of the vapor condenser, a control valve between the vacuum pump and the vapor chamber, and a metering device incorporated in the condensate outflow line for controlling the outflow of condensate from the condenser. The control valve is controlled by the liquid level sensor in the condenser so that as liquid level rises above a predetermined level, the control valve is closed in order to stop drawing off of vapor by the vacuum pump. As the liquid level falls below the predetermined level, the control valve is opened and the vapor and the extraneous gases are again drawn off by the vacuum pump.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DESCRIPTION OF THE DRAWING

FIG. 1 is a schematic representation of a system in accordance with the present invention.

DETAILED DESCRIPTION OF THE PREFERRED EMBODIMENT

Referring now to the drawing, there is shown a vapor condenser 1 wherein condensation occurs. The condenser 1 is provided with a cooling coil 2 within which a refrigerant or cooling liquid flows. The quantity of condensate in the vapor condenser 1 is controlled by means of a metering device 4.

A liquid level sensor 3 in the vapor condenser 1 operates to effect opening and closing of a control valve 5 depending upon the level of the liquid in the vapor condenser 1. The control valve 5 is operated to enable pumping out of extraneous gases and vapors from the vapor chamber of the vapor condenser 1 by means of a vacuum pump 6.

In the operation of the system in accordance with the present invention, if the liquid level sensor 3 is submerged in condensate within the vapor condenser 1, then the control valve 5 will be closed. If the condensate output drops below a predetermined value due to an increase in extraneous gases and/or vapors in the condenser 1, then the liquid level in the condenser 1 will fall and the liquid level sensor 3 will sense the lower liquid level and operate to open the valve 5. As a result, the extraneous gases and/or vapors will be pumped out by the vacuum pump 6. As a result, the condensation output of the condenser 1 will again rise.

If the condensation output is sufficient large that the liquid level sensor 3 becomes submerged by the condensate, the valve 5 is closed by the sensor 3. Further rise in the condensate level will submerge a part of the condensation surface and thus the condensation output is reduced again. As long as there are only small quantities of extraneous gases and/or vapors in the vapor condenser 1, the liquid level sensor will remain submerged and the valve 5 will be closed. The condensation output will again fall only when there is a high proportion of extraneous gas. Less liquid will condense than the amount of liquid which escapes through the metering device 4 and the valve 5 will be again opened by the liquid level sensor 3.

The valve 5 may be actuated proportionately for various levels of condensate or to provide only complete opening or closing of the valve 5.

The quantity of condensate and therefore the condensation output can be controlled utilizing the metering device 4, by controlling the amount of the condensation surface covered by the condensate. Therefore, the vacuum pump 6 is only in operation when the condensation output is reduced, i.e., when the liquid level falls below the level of the liquid level sensor 3.

While a specific embodiment of the invention has been shown and described in detail to illustrate the application of the inventive principles, it will be understood that the invention may be embodied otherwise without departing from such principles.

What is claimed is:

1. Vacuum condensation apparatus for condensing vapors at reduced pressure comprisng a cooled vapor condenser defining therein a vapor chamber and including a vapor supply line, liquid level sensor means within said vapor condenser for sensing the level of liquid therein, vacuum pump means connected with said vapor chamber of said condenser for drawing vapor therefrom, control valve means connected between said vapor chamber and said vacuum pump means for controlling drawing of vapor from said vapor chamber, and a metering device for controlling the outflow of liquid condensate from said condenser, said liquid sensor means being connected with said control valve means to close said control valve means when the liquid level in said condenser rises above a predetermined level and to open said control valve means when said liquid level falls below said predetermined level.

2. Apparatus according to claim 1 wherein the condensation output is maintained constant.

3. Apparatus according to claim 1 or 2 wherein said control valve means is adjusted continuously in dependence upon the liquid level in said condenser.

* * * * *